Apr. 3, 1923.
W. CASEY
FISHING TOOL
Filed Mar. 16, 1921
1,450,541
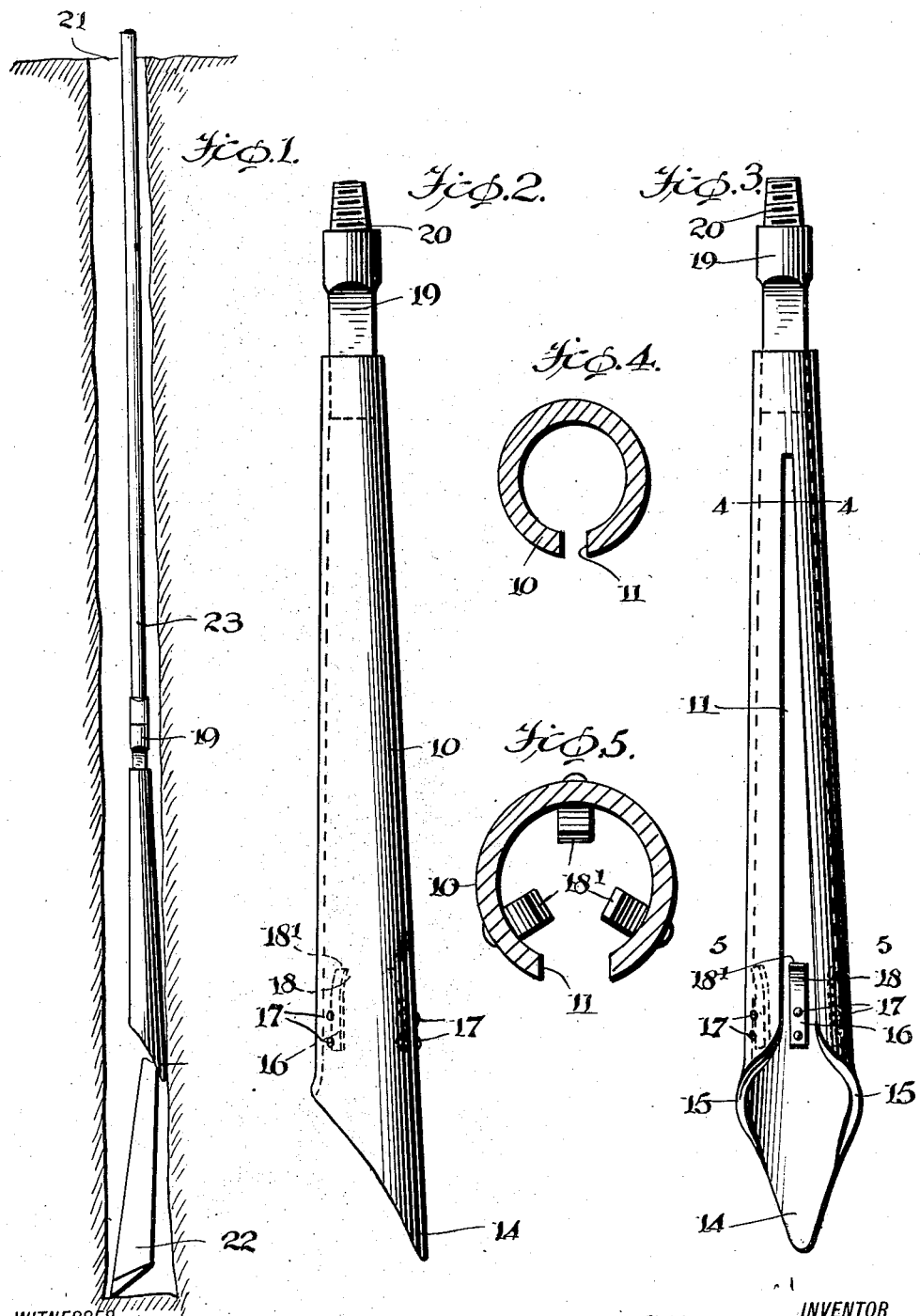
WITNESSES
INVENTOR
William Casey,
BY
ATTORNEYS Patented Apr. 3, 1923.

1,450,541

UNITED STATES PATENT OFFICE.

WILLIAM CASEY, OF TULSA, OKLAHOMA.

FISHING TOOL.

Application filed March 16, 1921. Serial No. 452,703.

*To all whom it may concern:*

Be it known that I, WILLIAM CASEY, a citizen of the United States, and a resident of Tulsa, in the county of Tulsa and State of Oklahoma, have invented certain new and useful Improvements in Fishing Tools, of which the following is a specification.

This invention relates to a fishing tool.

The object of the invention is to provide a tool of the above character which is adapted for connecting itself with loose material or tools which may be in the bottom of an oil well or other well of small cross sectional area, and thereby permitting said loose material or tool to be lifted from the well.

It is also an object that the fishing tool be simple in construction, durable, and inexpensive to manufacture.

Other objects will hereinafter appear.

The invention is illustrated by way of example in the accompanying drawings, in which—

Figure 1 is a section of a well and illustrating the application of my invention, Figures 2 and 3 are side elevations and a rear elevation respectively of the fishing tool, Figure 4 is a transverse section taken on the line 4—4 of Figure 3, Figure 5 is a transverse section taken on the line 5—5 of Figure 3.

Referring to the drawings more particularly, the fishing tool as shown in detail in Figures 2 and 3, comprises a casing generally indicated at 10 which tapers toward its upper end and has a slot 11 formed longitudinally thereof, said slot extending from the lower end of the casing to a point near its upper end. The slot is also tapered toward its upper end as shown. The lower and enlarged end of the casing 10 is cut on a transverse curved line to form a pointed spade-like portion 14. Above this spade-like portion the end edges are turned outwardly to form the curved lips 15, each of said lips terminating at a point slightly above the lower end of the slot 11 in the casing. Adjacent the lower end of the casing and upon its interior surface there is secured a plurality of circumferentially spaced dogs 16. Each dog comprises a short strip of spring metal which is suitably secured to the casing by means of rivets as indicated at 17 and having its upper end curved inwardly as indicated at 18; and said end preferably brought to a point as indicated at 18'.

In the upper end of the casing 10 there is sweated or otherwise secured one end of a coupling member 19, said coupling having its other end reduced and threaded as at 20. The coupling 19, may of course, be formed integral with the casing 10 if so desired.

Now referring to Figure 1, in which the application of my invention is illustrated, 21 indicates a well, and 22 the tool which has become lost therein. The fishing tool is connected to the lower end of the shaft 23, and lowered into the well to a position so that its pointed end 14 may engage the tool 22. By properly manipulating the shaft 23, the pointed end 14 of the fishing tool will guide the one end of the tool 22 within the casing 10. The tool 22 entering the casing will be pressed between the dogs 16 which will frictionally engage and hold the same. The fishing tool may be then raised from the well together with the tool 22.

While I have shown the preferred form of my invention, it is to be understood that I am aware of the fact that the general arrangement and construction could be slightly changed by those skilled in the art without departing from the spirit of my invention as indicated by the appended claim.

I claim—

A fishing tool of the character described, comprising a casing section tapering toward its lower end and longitiudinally slotted from its lower end to a point adjacent its upper end, a spade-like point formed on the lower end of the casing having the upper end portion of its edges curved outwardly to form a lip, and a series of circumferentially arranged dogs secured to the interior of the casing adjacent the lower or larger end thereof, each dog consisting in a resilient strip of metal arranged longitudinally of the casing and having its lower end secured to the casing and its upper and free end portion curved inwardly with respect to the longitudinal axis of the casing.

WILLIAM CASEY,